US008478891B1

(12) United States Patent
Breau et al.

(10) Patent No.: US 8,478,891 B1
(45) Date of Patent: Jul. 2, 2013

(54) EMPLOYING SOCKET RANGES TO ASCERTAIN LAYER 2 ADDRESSES

(75) Inventors: Jeremy R. Breau, Kansas City, MO (US); John H. Bennett, III, Lawrence, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 782 days.

(21) Appl. No.: 12/690,825

(22) Filed: Jan. 20, 2010

Related U.S. Application Data

(63) Continuation-in-part of application No. 12/634,299, filed on Dec. 9, 2009, which is a continuation-in-part of application No. 12/433,483, filed on Apr. 30, 2009, which is a continuation-in-part of application No. 12/400,588, filed on Mar. 9, 2009, now Pat. No. 8,279,853.

(51) Int. Cl.
*G06F 15/16* (2006.01)

(52) U.S. Cl.
USPC .......................... 709/233; 709/227; 709/230

(58) Field of Classification Search
USPC .................. 709/227–228, 230–233
See application file for complete search history.

(56) References Cited

U.S. PATENT DOCUMENTS

| | | | | |
|---|---|---|---|---|
| 7,031,275 | B1 * | 4/2006 | Borella et al. | 370/328 |
| 7,471,684 | B2 * | 12/2008 | Finley et al. | 370/392 |
| 7,974,311 | B2 * | 7/2011 | Vesterinen et al. | 370/475 |
| 2005/0174998 | A1 * | 8/2005 | Vesterinen et al. | 370/354 |

OTHER PUBLICATIONS

Reverse DNS Lookup, accessed on Dec. 14, 2009, http://en.wikipedia.org/wiki/Reverse_DNS_lookup.
Link Layer, accessed Dec. 7, 2009, http://en.wikipedia.org/wiki/Link_Layer.
Internet Protocol Suite, accessed Dec. 7, 2009, http://en.wikipedia.org/wiki/Internet_Protocol_Suite.
File: IP Stack Connections.svg, accessed Dec. 7, 2009, http://en.wikipedia.org/wiki/File:IP_stack_Connections.svb.
OSI Model, accessed Dec. 7, 2009, http://en.wikipedia.org/wiki/OSI_model.
Network Layer, accessed Dec. 7, 2009, http:/len.wikipedia.org/wiki/Network_Layer.
Internet Protocol, accessed Dec. 7, 2009, http://en.wikipedia.org/wiki/Internet_Protocol.
Internet Layer, accessed Dec. 7, 2009, http://en.wikipedia.org/wiki/Internet_Layer.
Address Resolution Protocol, accessed Dec. 7, 2009, http://en.wikipedia.org/wiki/Address_Resolution_Protocol.

* cited by examiner

Primary Examiner — Minh-Chau Nguyen

(57) ABSTRACT

Computer systems, computer-readable media, and computerized methods for determining a media access (MAC) address that corresponds with a network identifier in a wireless or wired network are provided. A dynamic host configuration protocol (DHCP) server is employed to allocate a set of socket IP addresses that include a common IPv4 address paired with a selected group of ports, where none of the ports in the selected groups overlap. When assigned to a client device, the socket IP address uniquely identifies the client device within the network. A host device within the network is configured to broadcast an address resolution protocol (ARP) request to other devices within the network, such as the DHCP server, where the ARP request includes a socket IP address associated with recipient(s) of communications from the host device. In response to the ARP request, the appropriate device or DHCP server returns a MAC address of the recipient.

16 Claims, 11 Drawing Sheets

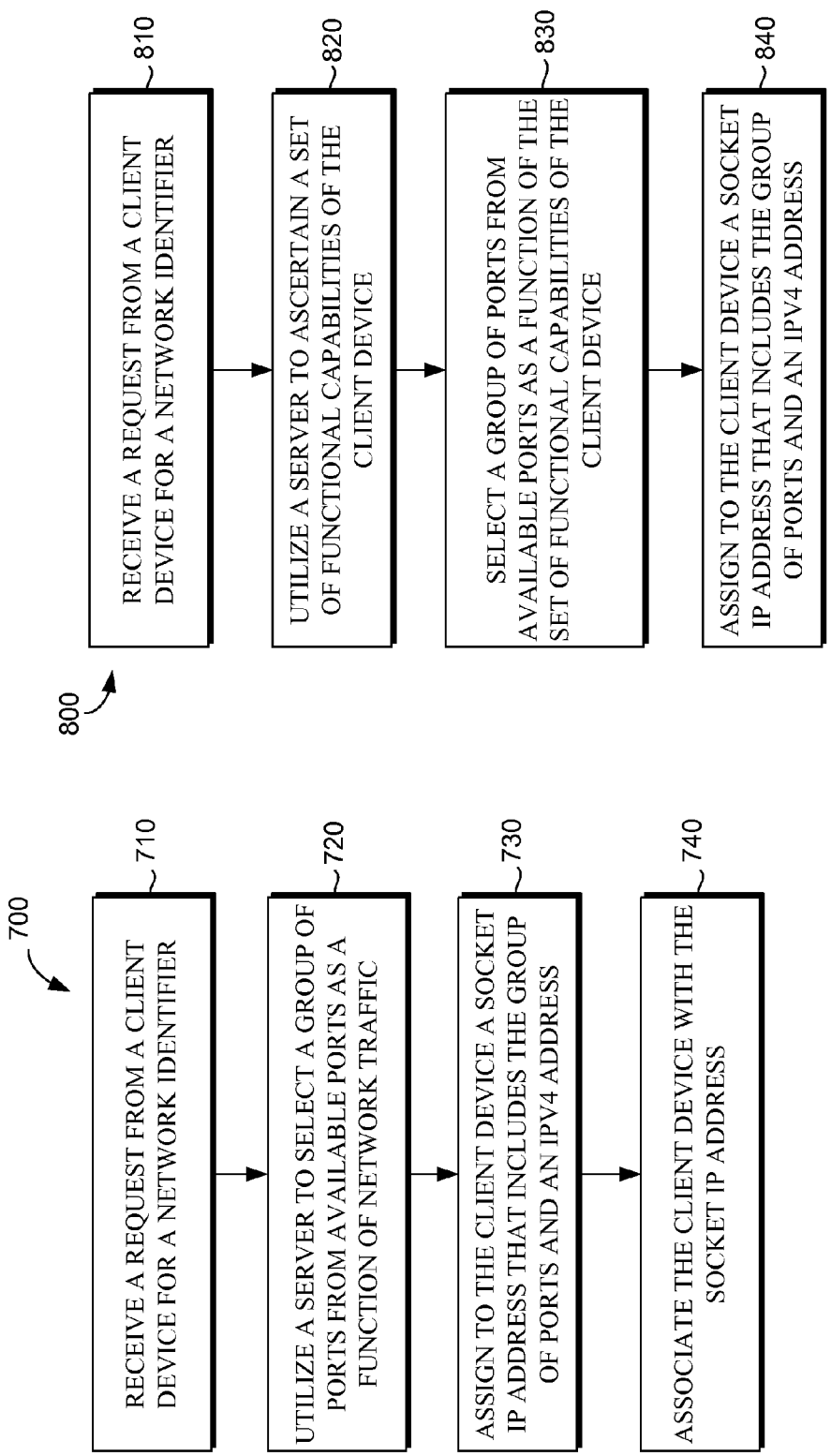

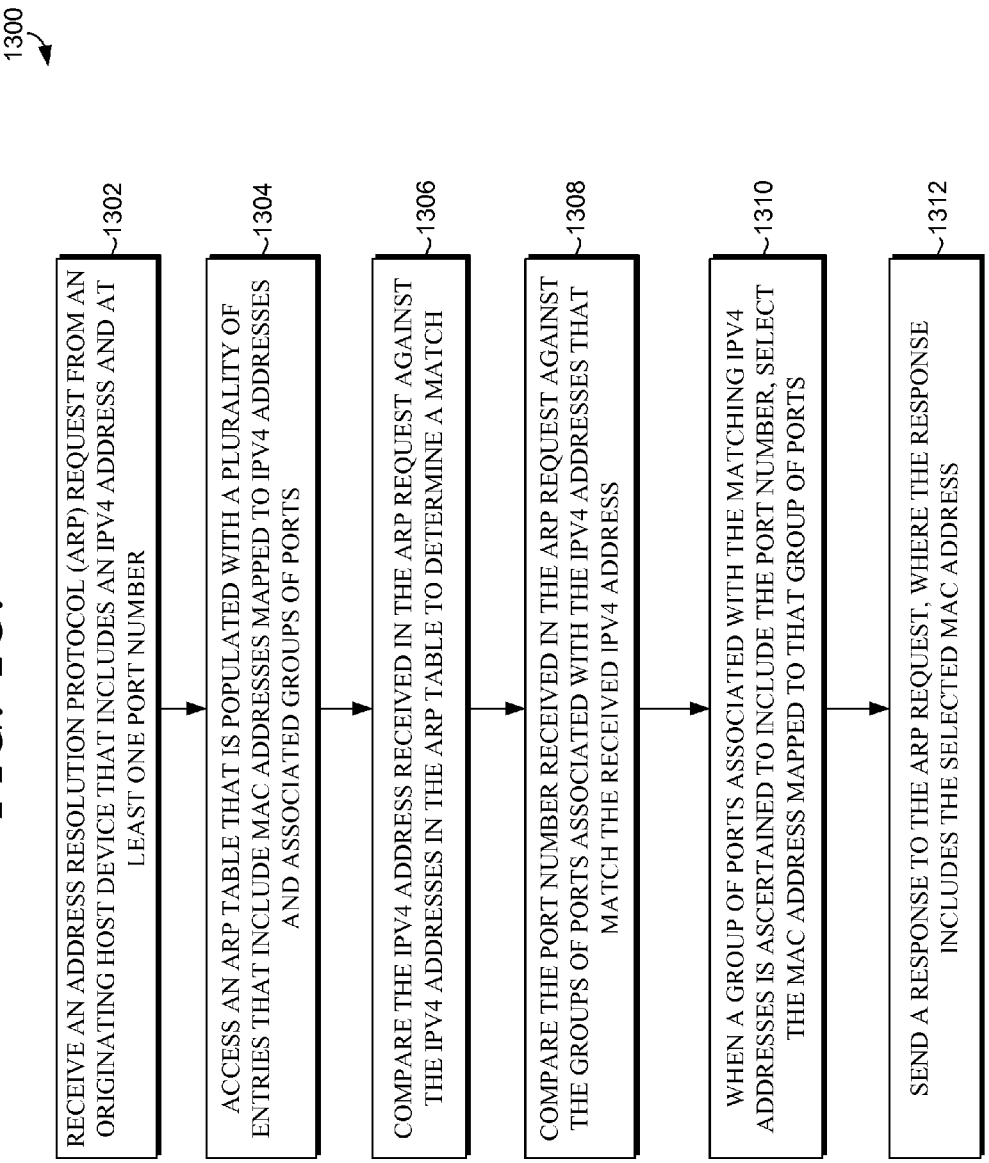

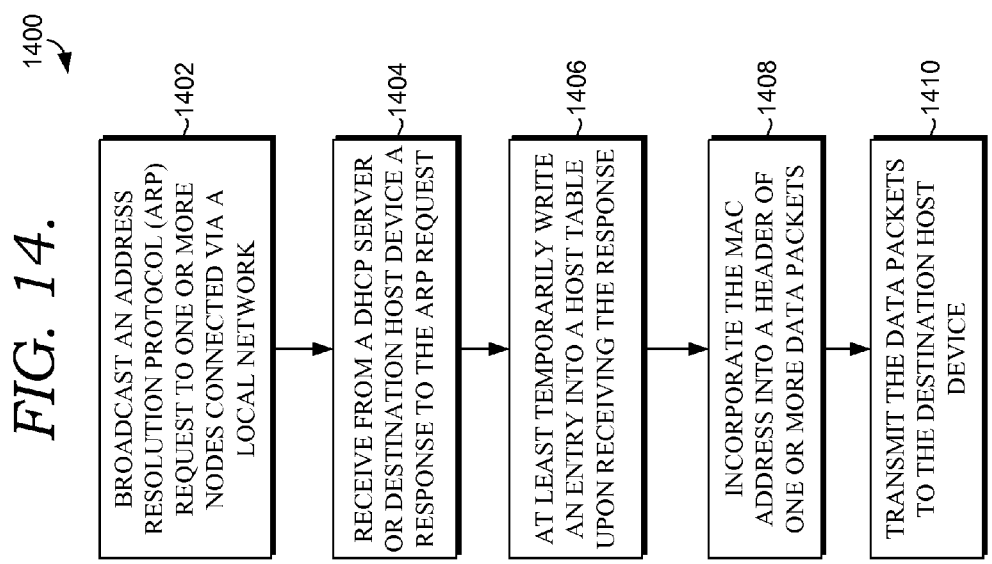

EMPLOYING SOCKET RANGES TO ASCERTAIN LAYER 2 ADDRESSES

CROSS-REFERENCE TO RELATED APPLICATIONS

This application is a continuation-in-part of prior U.S. application Ser. No. 12/634,299 filed on Dec. 9, 2009, entitled "ALLOCATING SOCKET RANGES TO INCREASE ADDRESS SPACE," which is a continuation-in-part of prior U.S. application Ser. No. 12/433,483 filed on Apr. 30, 2009, entitled "SOCKET-BASED INTERNET PROTOCOL FOR WIRED NETWORKS," which is a continuation-in-part of prior U.S. application Ser. No. 12/400,588 filed Mar. 9, 2009, entitled "SOCKET-BASED INTERNET PROTOCOL FOR WIRELESS NETWORKS." The teachings of U.S. application Ser. Nos. 12/634,299, 12/433,483, and 12/400,588 are hereby incorporated by reference in their entirety.

BACKGROUND

Communication among computing devices typically occurs through networks. For computing devices in a wireless or wired network to communicate, each device must have a unique network identifier. In packet-switched networks, each network device is assigned an internet protocol (IP) address to identify the particular device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of client devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the present invention relate to systems and methods for assigning unique network identifiers in a wired or wireless network. The systems and methods facilitate assigning a unique network identifier, which includes an IPv4 address and sockets or ports, to a host device that is active on the network. Utilizing this socket-based, unique network identifier allows for the assignment of many unique network identifiers to multiple host devices that are active on the same network and that use the same IPv4 address. Because each unique network identifier includes a group of ports in addition to the IPv4 address, the usefulness of a single IPv4 address is extended from one client device to multiple host devices.

Upon assigning these socket-based, unique network identifiers (hereinafter "socket IP addresses") to various client devices within the wired or wireless network, the client devices may communicate among each other using the socket IP addresses. In an exemplary embodiment, a host device that is preparing to initiate a communication (i.e., originating host device) may identify a name of a host device to target as the recipient of the communication (i.e., destination host device). The originating host device may then determine the destination host device's network layer-3 address, or IPv4 address, by conducting a resolution process. In instances, the originating host device utilizes a domain name system (DNS) lookup to perform the resolution operation that translates the name of the destination host device to an IPv4 address and one or more ports that are utilized to convey the communication.

This resolved IPv4 address in conjunction with the port(s) correspond to a particular socket IP address within a local network. Typically, this socket IP address has been previously assigned to the destination host device using at least one of the allocation schemes discussed more fully below. Once the socket IP address is known to the originating host device, the originating host device broadcasts a request message that includes the socket IP address to a plurality of host devices and other nodes connected via the local network. The general intent of the request message is to acquire the data-link layer address, or media access control (MAC) address, of the destination host device and to use the MAC address to route data packet(s) thereto.

Upon receiving the request message, the host devices in the local network may access the socket IP address carried in the request message and compare the accessed socket IP address against the socket IP address assigned to each of the host devices. Of the host devices that receive the request message, the destination host device will likely ascertain that the accessed socket IP address matches its previously assigned socket IP address. Accordingly, just the destination host device may response to the originating host device with a confirmation of the match and an indicia of the MAC address assigned to the destination host address.

Upon receiving the response from the destination host device, the originating host device is configured to write an entry into a host table that includes MAC address mapped to the socket IP address assigned to the destination host device. In one embodiment, when the originating host device constructs the data packets to transmit to the destination host device, the originating host device reads the host table to determine the MAC address of the destination host device and incorporates the MAC address into a pre-designated portion of the header of the data packets. Consequently, the destination host device may properly receive the data packets upon transmission from the originating host device.

In another embodiment, a computer system is provided that includes a server (e.g., dynamic host configuration protocol (DHCP) server) that determines a MAC address of the destination host device upon being solicited by an originating host device, which is the device in the local network that is attempting to initiate a communication. This embodiment essentially eliminates the process of the originating host device sending request messages to other host devices connected within the local network. Initially, the DHCP server is configured to receive an address resolution protocol (ARP) request sent from the originating host device. Typically, the ARP request includes an IPv4 address and a port number that were ascertained during the resolution processed discussed above. Upon identifying the IPv4 address and the port number carried in the ARP request, the DHCP server accesses an ARP table that is populated with a plurality of entries. These entries in the ARP table include MAC addresses mapped to both IPv4 addresses and groups of ports. The DHCP server then compares the IPv4 address received in the ARP request against the IPv4 addresses in the ARP table to determine a match and compares the port number received in the ARP request against the groups of ports associated with the IPv4 address that matches the received IPv4 address. When a group of ports associated with the matching IPv4 address is ascertained to include the port number, the DHCP server selects the MAC address mapped to the ascertained group of ports and sends a response that includes the selected MAC address to the originating host device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein:

FIG. 7 is a flow chart of an exemplary method for allocating a group of ports from available ports as a function of network traffic, according to an embodiment of the present invention;

FIG. 8 is a flow chart of an exemplary method for allocating a group of ports from available ports as a function of a set of functional capabilities of a client device, according to an embodiment of the present invention;

FIG. 13 is a flow chart of an exemplary method for determining a media access control (MAC) address upon being solicited by an originating host device, according to an embodiment of the present invention; and FIG. 14 is a flow chart of an exemplary method for routing one or more data packets within a local network using a MAC address, according to an embodiment of the present invention.

DETAILED DESCRIPTION

Figure 1:
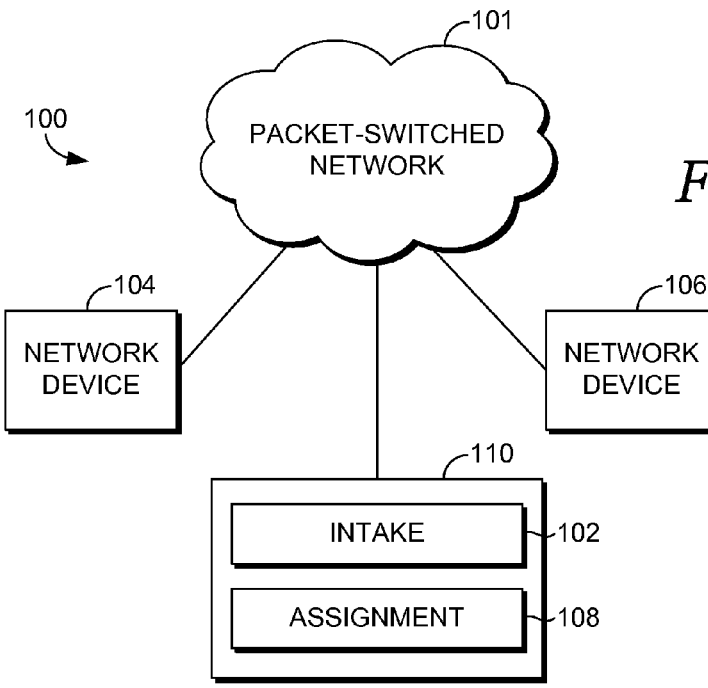
FIG. 1 is a block diagram of a unique network identifier assignment system according to an embodiment of the present invention.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems and methods for assigning unique network identifiers in a packet-switched wired network as well as in a wireless network. Within one or more of these networks, information is divided into packets and routed to a destination. In some instances, internet protocol (IP) is the packet-switching protocol, which enables delivery of packets from a source device to a destination device. In order for a data packet to successfully complete the journey from source to destination, each source and destination device must have a unique network identifier. Currently, each network device in a packet-switched wired network or a wireless network is assigned an IP address as a unique network identifier. IP addresses can be assigned manually or through dynamic host configuration protocol (DHCP) or other protocols or methods.

In wireless networks or in packet-switched wired networks using DHCP, a DHCP server receives requests for IP addresses and assigns IP addresses. When a DHCP server responds to a client request for an IP address by assigning the client an IP address, a router in the network sees the assignment and stores which IP address is assigned to which physical network device. In networks using address resolution protocol (ARP), the router stores the IP address in association with the network device's media access control (MAC) address. When future packets arrive at the router, the router will perform a lookup by destination IP address to determine to which MAC address the packet should be routed.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and virtually eliminate the concern of IPv4 address exhaustion, implementation of IPv6 requires a significant software and hardware investment.

When an IP address is assigned to a single network device, thousands of ports are often left unused. Each IP address has 65,536 ($2^{16}$) ports. Some ports are typically assigned specific functions. For example, port 80 is typically assigned to hypertext transfer protocol (HTTP) communication. Ports typically assigned to specific functions and ports actually used by the device to which an IP address is assigned only constitute a small percentage of the available ports, leaving potentially thousands of ports unused. The systems and methods described herein make use of these currently unused ports and allow one IP address to be assigned to potentially thousands of network devices, thus providing an immediate, cost-effective solution to IPv4 exhaustion.

Embodiments of the invention relate to assigning a unique network identifier, including an IP address and one or more ports, to a network device in a wireless or packet-switched wired network. The combination of an IP address and a port is known as a socket and can be written as "IP_address:port." For example, the socket consisting of IP address 192.168.1.1 and port 1200 is written "192.168.1.1:1200." A second socket-based unique identifier can then be assigned to a second network device using the same IP address and one or more different ports that were not assigned to the first network device. For example, 192.168.1.1:1200-1299 may be assigned to a first network device, and 192.168.1.1:1300-1399 may be assigned to a second network device. Additional unique network identifiers may be created by combining IP address 192.168.1.1 and other port groupings. These additional unique network identifiers may be assigned to additional network devices.

FIG. 1 illustrates a unique network identifier assignment system 100 for a wireless or packet-switched wired network 101. In packet-switched network 101, which could be the Internet, a local area network (LAN), wide area network (WAN), or other packet-switched network, an intake component 102 receives requests to assign a unique network identifier to a network device, such as network device 104 and network device 106. The request could originate from network device 104 or from a router, server, network manager, or other network entity. Network device 104 may be a personal computer, computer workstation, printer, or other device physically connected to packet-switched network 101. In one embodiment, intake component 102 is a server or other computing device with software functionality to receive and forward requests for unique network identifiers. In alternate embodiments, the functionality of intake component 102 is distributed across multiple computing devices. In still other embodiments, intake component 102 is a functional component of a single server or computing device such as a server 110, which may be a DHCP server.

An assignment component 108 identifies an unassigned unique network identifier and assigns the unassigned unique network identifier to the requesting network device, such as network device 104 or network device 106. In one embodiment, assignment component 108 is a server or other computing device with software functionality to identify and assign unique network identifiers. In other embodiments, the functionality of assignment component 108 is distributed across multiple computing devices. In still other embodiments, assignment component 108 and intake component 102 are functional components of a single server or computing device, such as server 110, which may be a DHCP server. Assignment component 108 may also be the network manager.

The unique network identifier identified and assigned by assignment component 108 includes an IP address and one or more of that IP address's 65,536 ports. In one embodiment, the unused ports for a particular IP address are grouped before assignment, such that a list of unique network identifiers is created for one IP address, each identifier including the IP address and one or more ports. In certain embodiments, the unused ports of a particular IP address are organized into groupings of a number of ports predetermined to be generally sufficient for network devices—for example, 100 ports per grouping. The ports contained in each grouping may be continuous or non-continuous. According to these embodiments, when a request for a unique network identifier is received, assignment component 108 selects a unique network identifier from the list.

Embodiments of the invention present assignment component 108 with multiple IP addresses available to assign. In such embodiments, each IP address is divided into multiple unique network identifiers as described above. Assignment component 108 assigns a requesting network device any of the unassigned unique network identifiers. For example, assignment component 108 assigns IP address 1.2.3.4, combined with ports 220-319, to address-requesting network device 104. Assignment component 108 might then assign IP address 1.2.3.4, combined with a different port grouping, such as 320-419, to address-requesting network device 106. Alternatively, assignment component 108 assigns a different IP address, such as 9.8.7.6, combined with a port grouping to address-requesting network device 106. Although FIG. 1 indicates only two network devices for simplicity, any number of network devices is contemplated. No particular order need be followed in assigning unique network identifiers to network devices. That is, all unique network identifiers created from one particular IP address do not need to be assigned before unique network identifiers created from a different IP address are assigned.

Different network devices may require different numbers of total ports. In such embodiments, assignment component 108 evaluates what type of network device is requesting a unique network identifier, or whether the requesting network device has specific functions or requirements, including the device's bandwidth needs, and dynamically groups unused ports to form a unique network identifier with an appropriate number of ports. In another embodiment, an IP address's unused ports are grouped into groupings of different sizes before a request for a unique network identifier is received. In yet another embodiment, the ports are similarly grouped across the IP addresses. As such, the number and identity of the ports in the groups or port ranges are substantially consistent when handed out to the network devices. Depending on the embodiment of the invention, port grouping and creation of unique network identifiers could be performed by assignment component 108 or could be performed external to assignment component 108.

Assignment component 108 assigns a socket-based unique network identifier either automatically or manually. DHCP is the predominant protocol used to automatically assign IP addresses, DNS server addresses, Gateway IPs, and SubNet Masks, although other protocols could be used. As discussed above, in certain embodiments, assignment component 108 is part of a DHCP server. DHCP can be modified to assign a port with an IP address. Packet-switched communication can occur through a variety of transport layer protocols such as transmission control protocol (TCP) or user datagram protocol (UDP). For a network device running the Microsoft® Windows® operating system, a socket-based unique network identifier can be assigned using the commands below. These exemplary commands assign a socket-based unique network identifier created by combining an IP address and ports 34,000-34,999 of that IP address. Commands are presented for both TCP and UDP communication.

netsh int ipv4 set dynamicport tcp start=34000 num=1000 (TCP); or
netsh int ipv4 set dynamicport udp start=34000 num=1000 (UDP).

For a network device running the Linux operating system, the same unique network identifier may be manually assigned using the following command:

sysctl —w net.ipv4.ip local port range="34000 35000."

Figure 2:
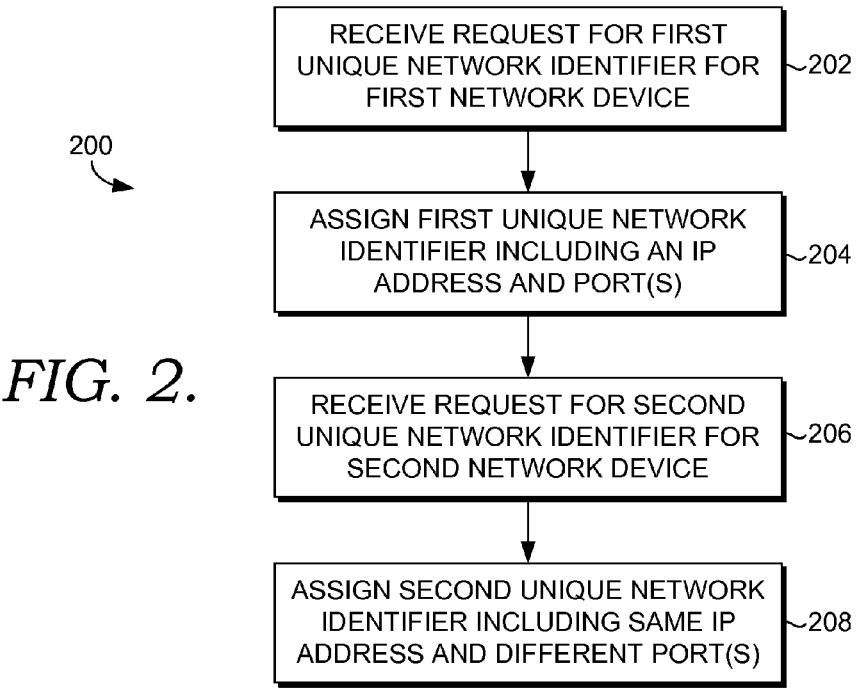
FIG. 2 is a flow chart of an exemplary method for assigning a unique network identifier in a wireless or packet-switched wired network.

FIG. 2 illustrates an exemplary method 200 of assigning a socket-based unique network identifier in a packet-switched wired network or in a wireless network. A request for a first unique network identifier for a first network device is received in step 202. The request could originate from the first network device or from a server, network manager, or other network entity. A first unique network identifier is assigned in step 204. The first unique network identifier includes an IP address and one or more ports, as discussed in detail above. The first unique network identifier can be assigned as described above. A request for a second unique network identifier for a second network device is received in step 206. The request for the second unique network identifier may also be received by the router. As with step 202, the request could come from the second network device or from a server, network manager, or other network entity. A second unique network identifier is assigned in step 208. The second unique network identifier includes the same IP address as the first unique network identifier and one or more ports that are not part of the first unique network identifier. Thus, method 200 allows two unique network identifiers to be assigned using only one IP address. Additional unique network identifiers created from the same IP address may also be assigned in this fashion.

Although communications may occur consistent with various protocols and standards on a wireless or wired, packet-switched network, the TCP/IP suite of protocols is the predominant standard. In TCP/IP implemented networks, a DHCP server typically controls the assignment of IP addresses. When a network device is connected, the device transmits a request for an IP address. The DHCP server receives the request and assigns the network device an IP address. Often, the DHCP server assigns the IP address for a specified time period, known as leasing the IP address to the network device. Various devices in the network may store the IP address assigned to the network device in association with the MAC address of the network device. For instance, those devices that have communicated with the DHCP server, the network device, or an address resolution protocol (ARP) cache can learn and maintain a record of the IP address and the MAC address of the network device. This association is typically stored in an ARP table. When packets are sent to the IP address associated with the network device, the router will perform a lookup in the ARP table and route the packets to the network device having the MAC address associated with the destination IP address.

Figure 3:
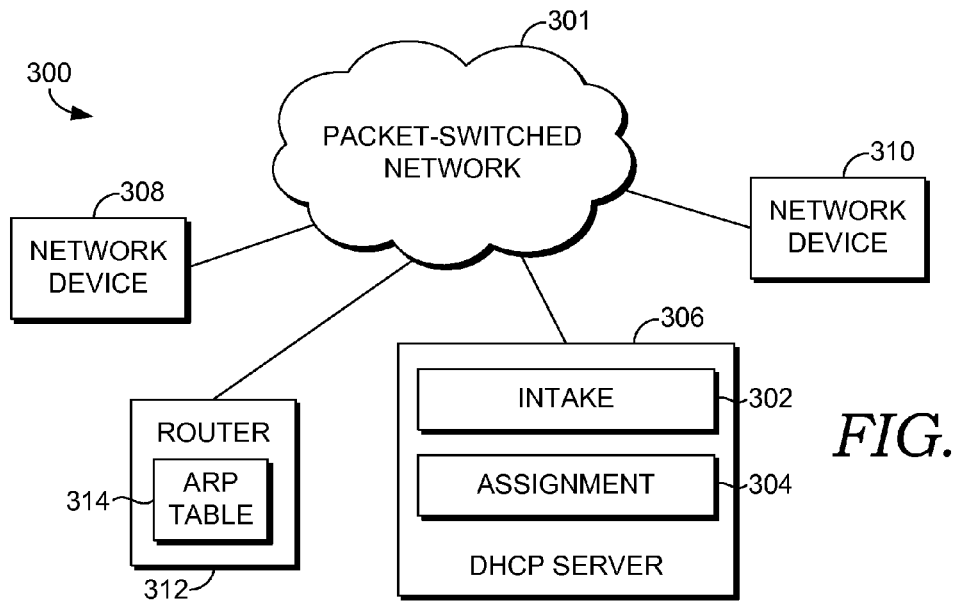
FIG. 3 is a block diagram of a unique network identifier assignment system, according to an embodiment of the present invention, in which a DHCP server assigns unique network identifiers.

FIG. 3 illustrates an embodiment of a unique network identifier assignment system 300 for a packet-switched network 301 that is configured for TCP/IP. In packet-switched network 301, which could be the Internet, a local area network (LAN), wide area network (WAN), or other packet-switched network, an intake component 302 and an assignment component 304 are part of a DHCP server 306. Intake component 302 receives a request to assign a unique network identifier to a network device, such as network device 308 and network device 310. The request could originate from network device 308 or from a server, network manager, or other network entity. Network device 308 may be a personal computer, computer workstation, printer, or other device physically connected to packet-switched network 301. In some embodiments, intake component 302 is a server or other computing device with software functionality to receive and forward requests for unique network identifiers. In other embodiments, the functionality of intake component 302 is distributed across multiple computing devices.

Assignment component 304 of DHCP server 306 identifies an unassigned unique network identifier and assigns the unassigned unique network identifier to the requesting network device, such as network device 308 or network device 310. In certain embodiments, assignment component 304 is a server or other computing device with software functionality to identify and assign unique network identifiers. The functionality of assignment component 304 is distributed across multiple computing devices in other embodiments.

The unique network identifier identified and assigned by assignment component 304 of DHCP server 306 includes an IP address and one or more of that IP address's 65,536 ports. In one embodiment, the total number of unused ports for a particular IP address is divided into groups before assignment, such that a list of unique network identifiers is created for one IP address, with each identifier including the IP address and one or more ports. The groups into which the unused ports of a particular IP address are divided may be a number of ports predetermined to be generally sufficient for network devices—for example, 100 ports per grouping. The ports contained in each grouping may be continuous or non-continuous. When a request for a unique network identifier is received, assignment component 304 of DHCP server 306 then selects an identifier from the list.

In embodiments of the invention, assignment component 304 of DHCP server 306 has multiple IP addresses available to assign. In such embodiments, each IP address is divided into multiple unique network identifiers as described above. Assignment component 304 assigns a requesting network device any of the unassigned unique network identifiers. For example, assignment component 304 could assign IP address 1.2.3.4, combined with ports 220-319, to address-requesting network device 308. Assignment component 304 could then assign IP address 1.2.3.4, combined with a different port grouping, such as 320-419, to address-requesting network device 310. Alternatively, assignment component 304 could assign IP address 9.8.7.6 combined with a port grouping to address-requesting network device 310. Assignment component 304 of DHCP server 306 assigns socket-based unique network identifiers using DHCP. When a unique network identifier is assigned, the unique network identifier and the MAC address of the network device to which it is assigned are captured by a router 312 and stored in an ARP table 314.

Different network devices may require different numbers of total ports. In certain embodiments, assignment component 304 of DHCP server 306 evaluates what type of network device is requesting a unique network identifier, or whether the requesting network device has specific functions or requirements, including the device's bandwidth needs, and dynamically groups unused ports to form a unique network identifier with an appropriate number of ports. In another embodiment, an IP address's unused ports may be grouped into groupings of different sizes before a request for a unique network identifier is received. In yet another embodiment, the ports are similarly grouped across the IP addresses. As such, the number and identity of the ports in the groups or port ranges are substantially consistent when handed out to the network devices. Depending on the embodiment of the invention, port grouping and creation of unique network identifiers may be performed by assignment component 304 or may be performed external to assignment component 304.

Figure 4:
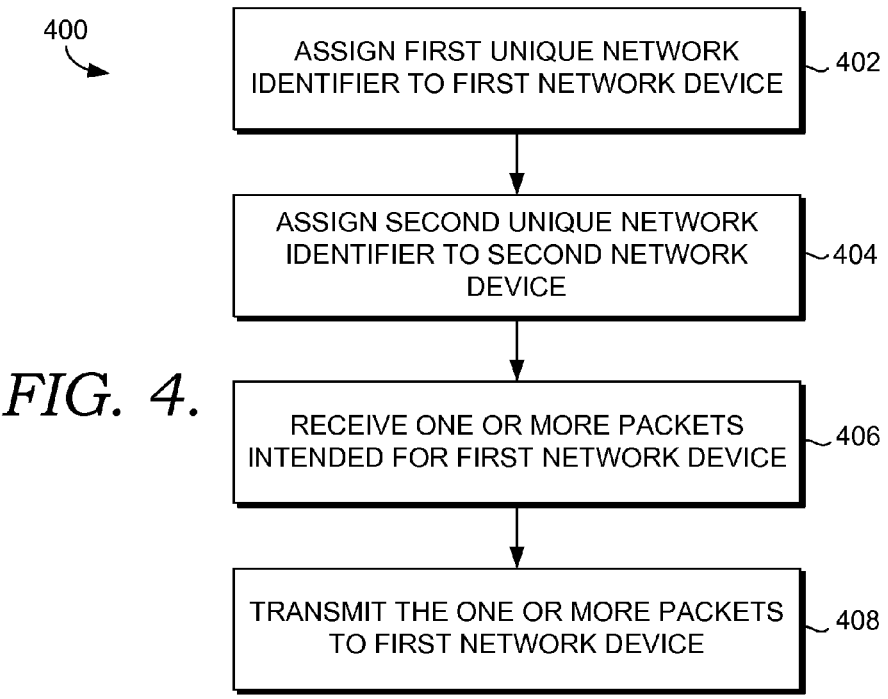
FIG. 4 is a flow chart of an exemplary method for communicating with a network device in a wireless or packet-switched wired network.

FIG. 4 illustrates an exemplary method 400 of communicating with a first network device in a wireless or packet-switched wired network having a plurality of network devices. In step 402, a first network device is assigned a first unique network identifier including an IP address and one or more ports. In step 404, a second network device is assigned a second unique network identifier. The second unique network identifier includes the same IP address assigned to the first network device and one or more different ports that are not assigned to the first network device, as described above. DHCP has been modified to allow assignment of one or more ports along with the IP address.

The first unique network identifier, as well as the MAC address of the network device to which it is assigned, and the second unique network identifier, as well as the MAC address of the network device to which it is assigned, are recorded by a various device in the network, such as a router, and can be used to populate the router's ARP table or an ARP cache. For instance, any devices that have communicated with the DHCP server, the network device, or the ARP cache can learn and maintain a record of the unique network identifiers and the MAC addresses of the network devices. ARP has been modified to allow recordation of both an IP address and one or more ports. One or more packets intended for the first network device are received in step 406. The receiving entity could be a router, server, network manager, or other computing device. Based on the unique network identifier, the one or more packets are transmitted to the first wireless device in step 408.

Figure 5:
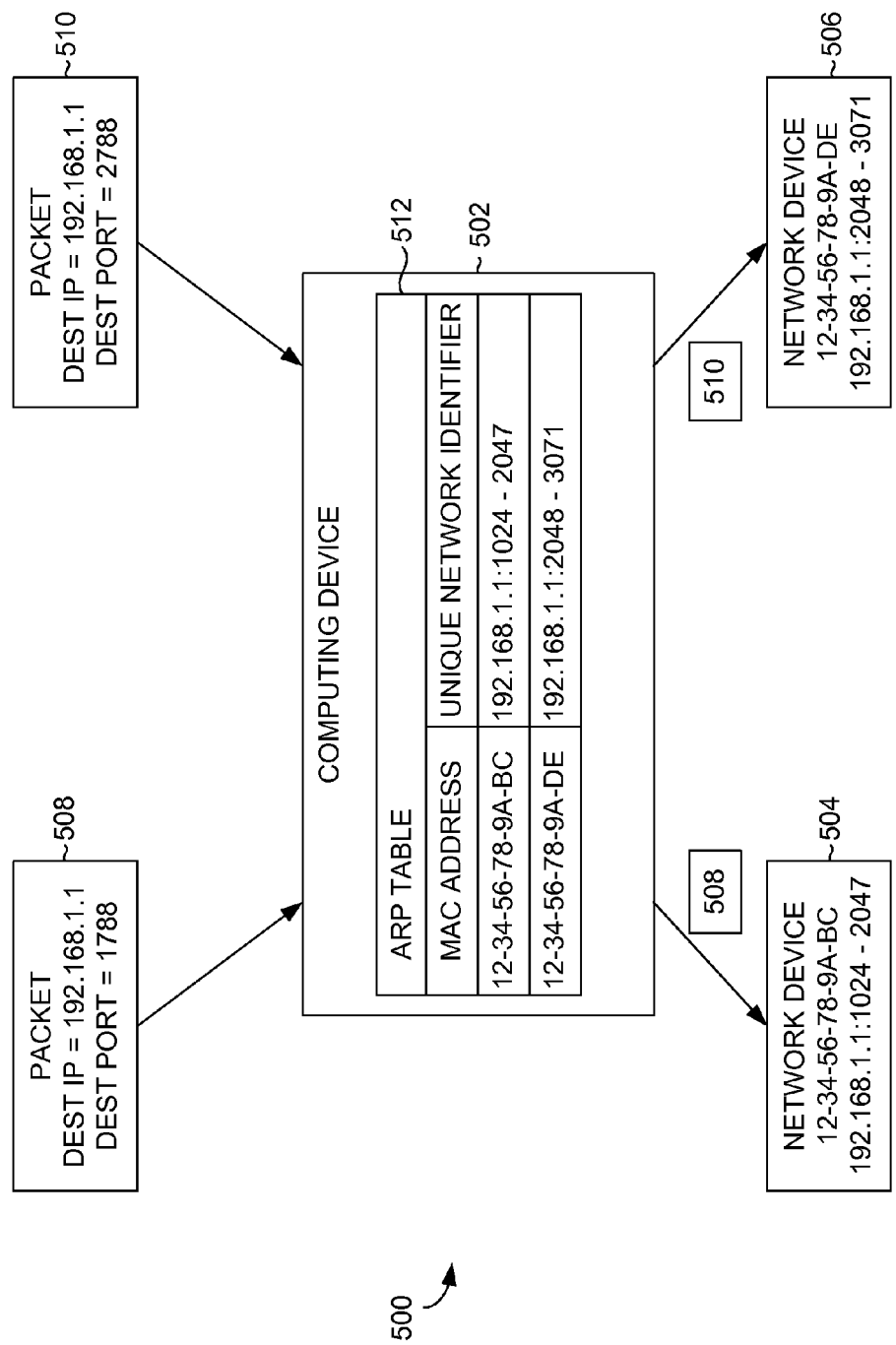
FIG. 5 is a block diagram of a network device communication system according to an embodiment of the present invention.

FIG. 5 further illustrates method 400 of communicating with a network device discussed with reference to FIG. 4 in a TCP/IP configured packet-switched wired network or wireless network. A TCP/IP-configured communication system 500 includes a computing device 502, a network device 504, and a network device 506. When network devices request access to the network, each device is identified by that device's MAC address. Each device's MAC address may be a universally administered address determined by the device manufacturer or a locally administered address assigned by the network administrator. MAC addresses are 48-bits in length and can be represented in hexadecimal format as XX-XX-XX-XX-XX-XX, where X is one of 0-9 and A-F. Network device 504 is identified by 12-34-56-78-9A-BC, and network device 506 is identified by 12-34-56-78-9A DE. Network device 504 is assigned IP address 192.168.1.1 and port range 1024-2047. Network device 506 is also assigned IP address 192.168.1.1 but is assigned a different port range—2048-3071. For each network device, the assigned unique network identifier and MAC address pair are recorded in ARP table 512 of computing device 502.

A packet 508 and a packet 510 are received by computing device 502. Packet 508 has a destination IP address of 192.168.1.1 and a destination port of 1788. Packet 510 has a destination IP address of 192.168.1.1 and a destination port of 2788. When packet 508 arrives at computing device 502, computing device 502 compares the destination IP address and destination port of packet 508, which is 192.168.1.1:1788, to the ARP table entries. After accessing the ARP table, computing device 502 determines that network devices with the MAC addresses 12-34-56-78-9A BC and 12-34-56-78-9A DE are associated with IP address 192.168.1.1. The router then locates the MAC address of the device whose unique network identifier port range includes the destination port 1788. Network device 504 (MAC address 12-34-56-78-9A BC) has been assigned port range 1024-2047, so packet 510 is routed to network device 504.

Similarly, packet 510 is received by computing device 502. Computing device 502 compares the destination IP address and destination port of packet 510, which is 192.168.1.1:2788, to the ARP table entries. After accessing the ARP table, computing device 502 determines that network devices with the MAC addresses 12-34-56-78-9A-BC and 12-34-56-78-9A DE are associated with IP address 192.168.1.1. The router then locates the MAC address of the device whose unique network identifier port range includes the destination port 2788. Network device 506 (MAC address 12-34-56-78-9A DE) has been assigned port range 2048-3071, so packet 508 is routed to network device 506.

Figure 6:
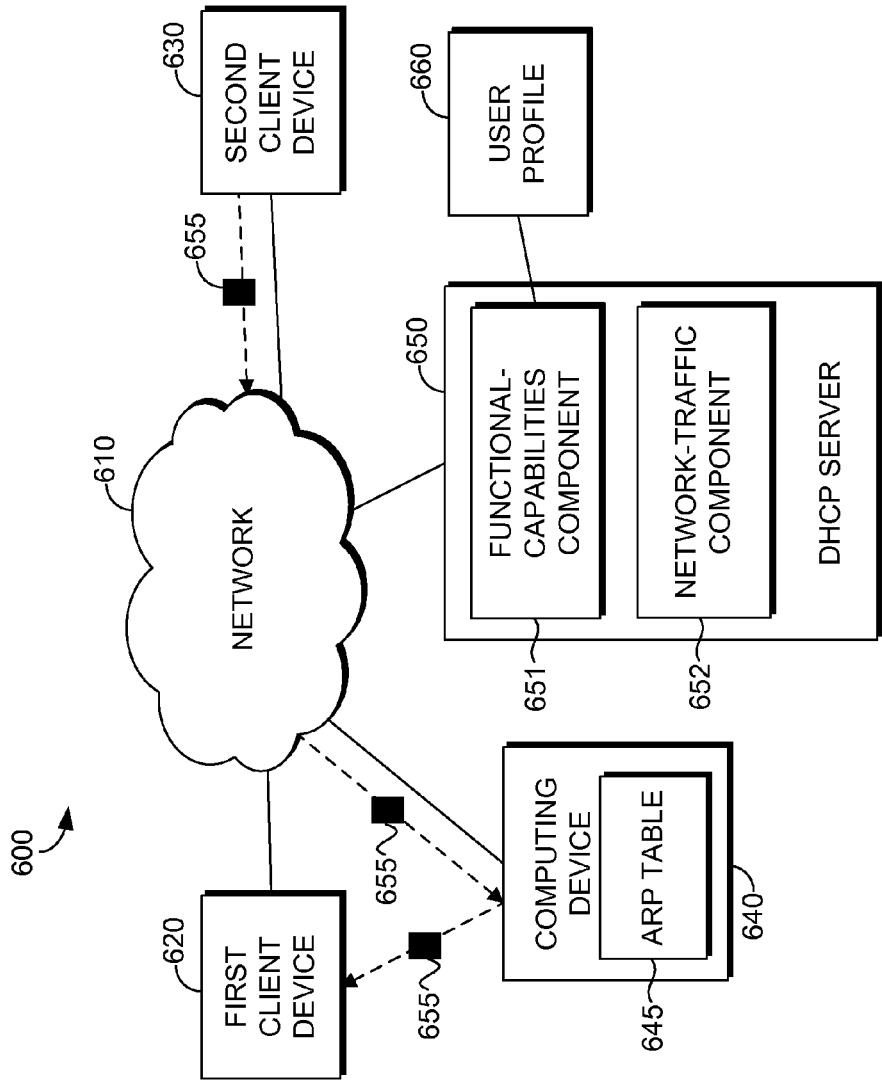
FIG. 6 is a block diagram illustrating an exemplary system architecture suitable for use in implementing embodiments of the present invention.

Turning now to FIG. 6, a block diagram illustrating an exemplary system architecture 600 suitable for use in implementing embodiments of the present invention is shown. In embodiments, the system architecture 600 is generally configured to assign network identifiers to client devices 620 and 630, and others, that are active in a network 610. As depicted, the system architecture 600 includes the client devices 620 and 630, a computing device 640, a DHCP server 650 that hosts a functional-capabilities component 651 and a network-traffic component 652, and a user profile 660.

This exemplary system architecture 600 is but one example of a suitable environment that may be implemented to carry out aspects of the present invention, and is not intended to suggest any limitation as to the scope of use or functionality of the invention. Neither should the illustrated exemplary system architecture 600 be interpreted as having any dependency or requirement relating to any one or combination of the components 651 and 652 as illustrated. In some embodiments, one or more of the components 651 and 652 may be implemented as stand-alone devices. In other embodiments, one or more of the components 651 and 652 may be integrated directly into the computing device 640 or the client devices 620 and 630. It will be understood by those of ordinary skill in the art that the components 651 and 652 illustrated in FIG. 6 are exemplary in nature and in number and should not be construed as limiting.

Accordingly, any number of components may be employed to achieve the desired functionality within the scope of embodiments of the present invention. Although the various components of FIG. 6 are shown with lines for the sake of clarity, in reality, delineating various components is not so clear, and metaphorically, the lines would more accurately be grey or fuzzy. Further, although some features of FIG. 6 are depicted as single blocks, the depictions are exemplary in nature and in number and are not to be construed as limiting (e.g., although only two client devices 620 and 630 are shown, many more may be communicatively coupled to the DHCP server 650).

In embodiments, the DHCP server 650 is generally configured to allocate a first socket IP address (including an IPv4 address and a first range of ports), to allocate a second socket IP address (including the IPv4 address and a second range of ports), and to assign the first socket IP address to the first client device 620 and the second socket IP address to the second client device 630. Typically, an ARP table 645 stores, at least temporarily, the assigned first socket IP address in association with the first client device 620 and the assigned second socket IP address in association with the second client device 630. In embodiments, the computing device 640 can access and read the ARP table 645 upon receiving a data packet, compare a socket IP address in a header of the data packet with entries in the ARP table 645, and direct transmission of the data packet within the network 610 based on the socket IP address.

The DHCP server 650 and the computing device 640, in embodiments, may take the form of various types of computing devices, such as, for example, a personal computer, desktop computer, laptop computer, wireless device, consumer electronic device, handheld device (e.g., personal digital assistant), various servers, a computing cloud, and the like. It should be noted, however, that the invention is not limited to implementation on such computing devices, but may be implemented on any of a variety of different types of computing devices within the scope of embodiments of the present invention.

Further, the DHCP server 650 and the computing device 640, in embodiments, may include memory that is linked to some form of a computing unit (e.g., central processing unit, microprocessor, etc.) to support operations of the components running thereon (e.g., functional-capabilities component 651 or network-traffic component 652). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the DHCP server 650 and the computing device 640 in order to enable each device to perform communication-related processes and other operations (e.g., allocating a range of ports based on one or more criteria). In another instance, the computing unit may encompass a processor (not shown) coupled to computer-readable media.

Generally, the computer-readable media stores, at least temporarily, a plurality of computer software components, including the components 651 and 652, that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Returning to FIG. 6, the first client device 620 and the second client device 630 represent two devices, of potentially millions of devices, that may be actively communicating with each other across the network 610. By way of example only and not limitation, the client devices 620 and 630 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 610. It should be noted, however, that the invention is not limited to implementation on such computing devices, but may be implemented on any of a variety of different types of computing devices within the scope of embodiments of the present invention.

In an exemplary embodiment of operation, the first client device 620 may become active on the network 610. In some instances, becoming active involves powering up and achieving connectivity with the network 610. Upon becoming active, the first client device 620 may query the DHCP server 650 with a request to provide a network identifier that is unique within the context of the network 610, thereby allowing the computing device 640 to identify data packets originating from the first client device 620 or being sent to the first client device 620. Upon detecting the first client device 620 as being active on the network 610, or upon receiving the request from the first client device 620, the DHCP server commences a process of assigning a first socket IP address to the first client device 620. Generally, the first socket IP address uniquely identifies the first client device 620 within the network 610 while recycling IPv4 addresses that have been previously assigned to other devices, which are active on the network 610, such as the second client device 630. Accordingly, the limited address space associated with IPv4 addresses is expanded through incorporation of port ranges into data-packet headers.

The process of assigning the first socket IP address to the first client device 620, implemented by the DHCP server 650, may initially involve assigning to the first client device 620 an IPv4 address that has available ports associated therewith. As discussed previously, there are 65,536 ports associated with an IPv4 address. However, those ports that are well-known and/or reserved for supporting common operations (e.g., port 21 for FTP, port 25 for SMTP, port 80 for HTTP, and other such ports) are typically excluded from being allocated to a particular client device and, thus, are not considered to be available ports. In addition, those ports associated with the IPv4 address that are currently or previously allocated to a client device on the network 610 are considered to be in use and are not available ports. By way of example, the DHCP server is configured to track and record the ports associated with the IPv4 address that are in use and to collect those remaining ports that are neither in use nor designated as well-known ports into the group of available ports that can be presently allocated to the first client device 620.

Once an IPv4 address associated with available ports is assigned to the first client device, a group of ports is selected from the available ports. In one instance, the selected group of ports is a range of ports of the available ports that is allocated to the first client device 620, where the IPv4 address and the allocated port range form the first socket IP address. However, although the phrase "range of ports" is used throughout, it should be understood and appreciated that any number of nonconsecutive ports may be allocated to a client device as part of the socket IP address. The functional-capabilities component 651, the network-traffic component 652, or a combination thereof may be employed to select a range of ports that is allocated to the first client device 620. Although two different components and methods for allocating ranges of ports will be described, it should be understood and appreciated that other types of suitable mechanisms that select available ports based on other criteria may be used, and that embodiments of the present invention are not limited to the functional-capabilities component 651 and the network-traffic component 652 described herein. For instance, ranges of ports may be selected based on a pattern of network usage associated with a particular customer or company that utilizes the network 610.

In an exemplary embodiment, the functional-capabilities component 651 generally allocates a range of ports to the first client device 620 and selects a size of the port range based on, or as a function of, functional capabilities of the first client device 620. The phrase "functional capabilities," as used herein, is not meant to be limiting, but may encompass any functionality that can be provided on a client device. By way of example, some functional capabilities that are contemplated by the present invention include sending and receiving emails, text and multimedia messages, registering contacts, accessing the Internet, playing online games, and taking and sharing photos and videos. These functional capabilities may be carried to the DHCP server 650 in the request for a network identifier from the first client device 620, or may be accessed at some memory location, such as a user profile 660, that is reachable by the functional-capabilities component 651. By way of example, an identity of the first client device 620 may be ascertained in the form of a MAC address upon the first client device 620 becoming active on the network 610. This ascertained MAC address may then be compared against the user profile 660 to discover the functional capabilities that are included within the first client device 620. In an exemplary embodiment, the functional-capabilities component 651 carries out the step of identifying the functional capabilities of the first client device 620 when the DHCP server 650 is authenticating the first client device 620 on the network 610.

The functional-capabilities component 651 may proceed to allocate a selection of the available ports associated with the IPv4 address utilizing the functional capabilities of the first client device 620. In one instance, the greater the number and/or the more complex the type of functional capabilities that are exhibited by the first client device 620, the greater the number of ports that will be awarded thereto (e.g., the larger the size of the range of ports). By way of example only, a low-end feature phone may be allocated 50 ports, which will adequately support the feature phone when operating at maximum capacity, while a high-end server may be allocated 1000 ports, which will adequately support the server when conducting high-bandwidth processing. Accordingly, this method of device-specific allocation relies on the assumption that different devices may require different amounts of ports to operate properly and, based on this assumption, the functional-capabilities component 651 individually selects ports for each device in order to fully expand the address space of each IPv4 address. In another instance, the functional-capabilities component 651 allocates a group of ports or a port range for assignment to a host that is consistent in composition (i.e., number and identity of ports) with groups of ports or port ranges that are allocated to similarly configured hosts.

In other embodiments, a default range of ports (e.g., 1000 ports, which supports operations of most devices regardless of their functional capabilities) is consistently allocated to each device on the network 610 from the available ports until a trigger-event is reached. In the case where the default range of ports is 1000 ports, about sixty-four devices may be granted a common IPv4 address while still being assigned distinct socket IP addresses. In some instances, the trigger-event may be a recognition that only a threshold number of available IPv4 addresses are left. In other instances, the trigger-event may be an arrival of a particular period of time during a day or a week that is recognized as having high network usage. Once the trigger-event occurs, the functional-capabilities component 651 may resume inspecting the functional capabilities of the client devices becoming active on the network 610 to determine a size of a range of ports to allocate to each of the active client devices, individually.

In an exemplary embodiment, the network-traffic component 652 generally allocates a range of ports to the first client device 620 and selects a size of the port range based on, or as a function of, an amount of traffic presently or previously occupying the network 610. As used herein, the phrase "network traffic" is not limited to current usage of the network 610, but may represent a load on the network during any window or snapshot of time. By way of example, the load on the network 610 during a particular window of time may be a tracked number of network connections that are made between particular hours or days. This load on the network 610 may be averaged over a predetermined number of days, such as just weekdays, weekend days, non-holidays, and the like, in order to generate network traffic values that accurately predict how many client devices will likely be active on the network 610 at any time during any day. Or, the network traffic may represent a snapshot of network usage that is periodically taken and stored for future reference. By way of example, the snapshot may describe a number of client devices occupying the network at a particular point in time (e.g., at a time proximate to when the first client device 620 is requesting a network identifier from the DHCP server 650).

By tracking the network traffic, the network-traffic component 652 can broaden or narrow the size of the port range allocated to the first client device 620 from the available ports. However, dynamically adjusting the size of the port ranges for each client device may expend an additional amount of processing resources. Accordingly, the network-traffic component 652 may be invoked when one or more criteria is met, and may sit in an inactive state otherwise. For instance, the network-traffic component 652 may be invoked to broaden or narrow the sizes of the port ranges upon the volume of network traffic in the network 610 exceeding a predetermined level. Further, the network-traffic component 652 may be returned to the inactive state upon the volume of network traffic in the network 610 falling below the predetermined level or meeting other criteria.

Once the DHCP server 650 assigns the first client device 620 the IPv4 address and allocates a range of ports thereto (e.g., utilizing one or more of the components 651 and 652), the resultant socket IP address is communicated to the first client device 620 and, potentially, stored at the ARP table 645 and/or at another memory location that is accessible to the DHCP server 650 or to the computing device 640. When attempting to communicate across the network 610, the first client device 620 may insert the socket IP address into a header of IPv4 data packets that are transmitted therefrom. The socket IP address within the header allows the computing device 640, via the ARP table 645, to identify the sender of the IPv4 data packets as the first client device 620. In addition, the computing device 640 is capable of routing IPv4 data packets 655 to the first client device 620 upon another client device, such as the second client device 630, populating the header of the IPv4 data packets 655 with the socket IP address assigned to the first client device 620. By way of example, the computing device 640 represents a last router in a hub structure of the network 610 that inspects the port range of the socket IP address to properly route the IPv4 data packets 655 to the first client device 620.

With reference to FIG. 7, a flow chart is illustrated that shows an exemplary method 700 for allocating a group of ports from available ports as a function of network traffic, according to an embodiment of the present invention. As depicted at block 710, a request from a first client device for a network identifier is received. A server, such as the DHCP server 650 of FIG. 6, is used to select a first group of ports from available ports based on, or as a function of, network traffic. This is depicted at block 720. As discussed above, in embodiments, the network traffic may represent a history of network usage during a relevant window of time, or a snapshot of a load on the network (e.g., a quantity or nature of client devices occupying or connected through the network). As depicted at block 730, the first client device is assigned a first socket IP address that includes the first group of ports and an IPv4 address, where the first group of ports are selected from the available ports that are associated with the IPv4 address. The first client device may be associated with the first socket IP address, as depicted at block 740. In embodiments, this association may be stored at a memory location, such as the ARP table 645 of FIG. 6, or may be communicated to one or more devices, such as the first client device 620 of FIG. 6. In embodiments, the first socket IP address may be leased to the first client device for a predefined amount of time (e.g., persisted in a cache across active sessions on the network), or may be dynamically recalculated every time the first client device submits a request for an network identifier.

The method 700 may also involve selecting a second group of ports from the available ports as a function of the network traffic and assigning to a second client device a second socket IP address that includes the second group of ports. The second socket IP address may further include the same IPv4 address assigned to the first client device at block 730. Generally, the first group of ports and the second group of ports do not share a common port. Accordingly, the first socket IP address uniquely identifies the first client device in the context of the network, while the second socket IP address uniquely identifies the second client device in the context of the network.

Turning to FIG. 8, a flow chart illustrating an exemplary method 800 for allocating a group of ports from available ports as a function of a set of functional capabilities of a client device is shown, according to an embodiment of the present invention. In one instance, the method 800 involves the steps of receiving a request from a first client device for the network identifier, and utilizing a server to ascertain functional capabilities of the first client device, as depicted at blocks 810 and 820 respectively. As discussed above, the number and the type of functional capabilities exhibited by client devices joined to the network may vary drastically therebetween. Accordingly, the size of the group of ports allocated to the client devices may also vary in concert with the number and the type of functional capabilities exhibited by each.

As depicted at block 830, a first group of ports is selected from available ports based on, or as a function of, the number and the type of the functional capabilities of the first client device. The server then assigns to the first client device a first socket IP address that includes the first group of ports and an IPv4 address, as depicted at block 840. Because this distinct number of ports is allocated to, or reserved for, the first client device, the first socket IP address assigned to the first client device is different from a second socket IP address assigned to a second client device even when the client devices share a common IPv4 address. Accordingly, an individual IPv4 address can be expanded to uniquely identify, within the context of the network, multiple client devices.

Figure 9:
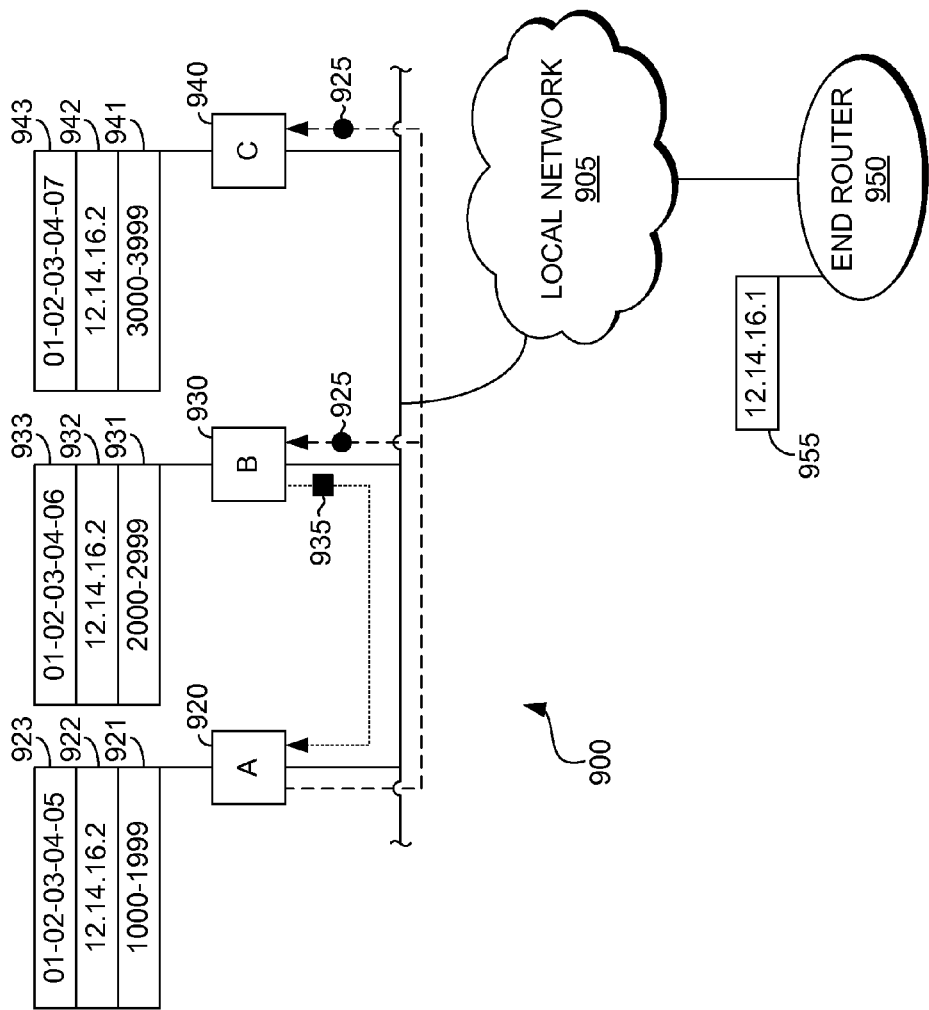
FIG. 9 is a block diagram illustrating an exemplary system architecture suitable for use in implementing embodiments of the present invention.

Turning now to FIG. 9, a block diagram illustrating an exemplary system architecture 900 suitable for use in implementing embodiments of the present invention is shown. In embodiments, the system architecture 900 is generally configured to provide the ability for host device A 920 to determine a data-link layer address, or layer-2 address, of other host devices within a local network 905, such as host device B 930 or host device C 940. As depicted, the system architecture 900 includes the host device A 920 (originating host device), the host device B 930 (destination host device), the host device C 940, an end router 950, and a DHCP server 910 all interconnected via the local network 905.

This exemplary system architecture 900 is but one example of a suitable environment that may be implemented to carry out aspects of the present invention, and is not intended to suggest any limitation as to the scope of use or functionality of the invention. Neither should the illustrated exemplary system architecture 900 be interpreted as having any dependency or requirement relating to any one or combination of the host devices 920, 930, and 940 as illustrated. It will be understood by those of ordinary skill in the art that the host devices 920, 930, and 940 illustrated in FIG. 9 are exemplary in nature and in number and should not be construed as limiting.

Accordingly, any number of devices may be employed to achieve the desired functionality within the scope of embodiments of the present invention. Although the various devices of FIG. 9 are shown with lines for the sake of clarity, in reality, delineating various devices is not so clear, and metaphorically, the lines would more accurately be grey or fuzzy. Further, although some features of FIG. 9 are depicted as single blocks, the depictions are exemplary in nature and in number and are not to be construed as limiting (e.g., although only three host devices 920, 930, and 940 are shown, many more may be communicatively inter-coupled).

The host device A 920, the host device B 930, and the host device C 940 represent three devices, of potentially millions of devices, that may be actively communicating with each other across the local network 905. By way of example only and not limitation, the host devices 902, 930, and 940 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 905. In instance, the host devices 902, 930, and 940 may represent one or more of the network devices 104 and 106 of FIG. 1 or the client devices 620 and 630 of FIG. 6. It should be noted, however, that the invention is not limited to implementation on such computing devices, but may be implemented on any of a variety of different types of computing devices within the scope of embodiments of the present invention. Further, the local network 905 may be any type of network (e.g., wired, wireless, Internet, LAN, packet-switched network, and the like) that facilitates intercommunication between the host devices 902, 930, and 940.

Initially, each of the host devices 902, 930, and 940 is provisioned with a data-link layer (layer 2) address. The data-link layer pertains to a set of protocols that operate to within a networking architecture of the local network 905 to interconnect the host devices 902, 930, and 940 over a physical layer (layer 1). Although a variety of types of data-link layer addresses may be employed, the exemplary embodiment depicted in FIG. 9 shows the host devices 920, 930, and 940 each provisioned with a unique media access control (MAC) address. In particular, the host device A 920 is provisioned with MAC address 01-02-03-04-05 (shown at reference numeral 923), the host device B 930 is provisioned with MAC address 01-02-03-04-06 (shown at reference numeral 933), and the host device C 940 is provisioned with MAC address 01-02-03-04-07 (shown at reference numeral 943). Typically, as used herein, the phrase "MAC address" generally refers to a globally unique identifier assigned to nodes (e.g., host devices 920, 930, and 940) within the local network 905. Often, MAC addresses are permanently assigned by a manufacturer of the node and usually encodes the manufacturer's registered identification number.

In an exemplary embodiment of operation, each of the host devices 920, 930, and 940 is assigned a socket IP address, which pertains to a unique network identifier of each of the nodes active within the local network 905, as discussed above. Also, as more fully discussed above, the socket IP addresses includes an IPv4 address and socket(s) or port(s). As shown in FIG. 9, each of the host devices 920, 930, and 940 are assigned a common IPv4 address 12.14.16.2 (reference numerals 922, 932, and 042). However, the socket IP address are distinct because the host device A 920 is assigned the group of ports 1000-1999 (see reference numeral 921), the host device B 930 is assigned the group of ports 2000-2999 (see reference numeral 931), and the host device C 940 is assigned the group of ports 3000-3999 (see reference numeral 941). That is, the socket IP addresses allow for the assignment of many unique network identifiers to the host devices 902, 930, and 940 interconnected on the same local network 905 that use the same IPv4 address by assigning different, non-overlapping ports thereto. As discussed above, various allocation schemes may be employed to determine the ports or port ranges that are assigned to particular devices.

Upon assigning these socket IP addresses to the host devices 902, 930, and 940, the host devices 902, 930, and 940 may communicate over the local network 905 using these assigned socket IP addresses. In an exemplary embodiment, the host device 920 that is preparing to initiate a communication (i.e., originating host device) may identify a name of a host device to target as the recipient of the communication (i.e., destination host device). For instance, the originating host device A 920 may receive a user-initiated instruction to connect to a web address "Sprint.com."

The originating host device A 920 may then determine the destination host device's network (layer-3) address, or IPv4 address, by conducting a resolution operation. In instances, the originating host device A 920 utilizes a domain name system (DNS) lookup to perform the resolution operation that translates the name (e.g., Sprint.com) of the destination host device to an IPv4 address and to one or more ports that are utilized to convey the communication.

This resolved IPv4 address in conjunction with the port(s) correspond to a particular socket IP address within the local network 905. Typically, this socket IP address has been previously assigned to the destination host device using at least one of the allocation schemes discussed above. Once the socket IP address, or at least the resolved IPv4 address and port number(s), is known to the originating host device A 920, the originating host device A 920 broadcasts a request message 925 that includes the resolved IPv4 address and port number(s) to the host devices B 930 and C 940 and other nodes connected via the local network 905. The general intent of the request message 925 is to solicit the data-link layer address, or MAC address, of the destination host device and to use the MAC address to route data packet(s) thereto.

Upon receiving the request message 925, the host devices 930 and 940 in the local network 905 may access the resolved socket IP address, or resolved IPv4 address and port number (s), carried in the request message 925 and may compare the accessed socket IP address against the socket IP address that they have been assigned. In one embodiment, of the host devices and nodes in the local network 905 that receive the request message 925, just the destination host device may ascertain that the accessed socket IP address in the request message 925 matches its previously assigned socket IP address. For instance, if "Sprint.com" corresponds to IPv4 address 12.14.16.2 and port 2010, host device B 930 will likely ascertain that this exemplary IPv4 address and port number in the request message 925 is associated with host device B's 930 previously assigned socket IP address (because the port 2010 is within the port range of 2000-2999).

Accordingly, in this embodiment, just the destination host device may respond to the originating host device A 920 with a confirmation of the match and an indicia of the MAC address assigned to the destination host address B 930. For instance, upon destination host device B 930 ascertaining that this exemplary IPv4 address (12.14.16.1) and port number (2010) in the request message 925 is associated with its previously assigned socket IP address, the host device B 930 is now self-identified as the proper destination host device and sends a response 935 to the originating host device A 920. In addition, the destination host device B 930 may include within the payload of the response 935 its MAC address 01-02-03-04-06 (see reference numeral 933).

Figure 10:
FIG. 10 is a diagrammatic illustration of an exemplary host table, according to an embodiment of the present invention.

Upon receiving the response 935 from the destination host device B 930, the originating host device A 920 is configured to write an entry into a host table that includes the MAC address 933 mapped to the socket IP address 931 and 932 assigned to the destination host device B 930. Turning now to FIG. 10, a diagrammatic illustration of an exemplary host table 1000 is shown, according to an embodiment of the present invention. As show, entry 1030 of the host table 1000 reflects the information communicated to the originating host device A 920 within the response 935.

In other embodiments, a plurality of nodes within the local network respond to the request message 925. In one instance, the nodes that have been assigned a common IPv4 address as the resolved IPv4 address in the request message 925 may respond without comparing the port or port range within the request message 925 against their assigned group of port numbers. In another instance, a multitude of nodes may respond to the request message 925 without further comparing the information of the request message 925 against their assigned identifiers. As such, the originating host device A 920 may receive a plurality of responses from interconnected nodes and may write information conveyed in one or more of the plurality of responses to the host table 1000. As depicted at FIG. 10, an end router 950 of FIG. 9, as well as host devices B 930 and C 940 have responded to the request message 925. Further, the originating host device A 920 has written the information from the end router 950, and host devices B 930 and C 940 into the host table 1000 as entries 1010, 1030, and 1040, respectively.

In the embodiment where many nodes of the local network 905 have responded to the request message 925, the originating host device A 920 may sort through the host table 1000 to determine the appropriate destination host device. In one instance, sorting through the host table 1000 may involve the originating host device A 920 comparing the port or range of ports that were identified in the resolution process against the ports written within the entries 1010, 1030, and 1040 of the host table 1000. In this instance, the originating host device A 920 may select the appropriate destination host device upon ascertaining that the resolved port or range of ports matches a port number included within a group of ports assigned to one or more nodes. Additionally, the originating host device A 920 may select the appropriate destination host device upon ascertaining that the resolved IPv4 address matches an IPv4 address assigned to one or more nodes that have responded. Upon selecting the appropriate destination host device (i.e., identifying a host device whose assigned IPv4 address corresponds with the resolved IPv4 address and whose assigned port numbers include the resolved port or range of ports), the originating host device A 920 identifies a MAC address of the appropriate destination host device by inspecting the data-link layer address mapped thereto within the host table 1000.

Although a single configuration of the host table 1000 has been described, it should be understood and appreciated by those of ordinary skill in the art that other types of suitable formats that allow for entries to be added, updated, and removed may be used, and that embodiments of the present invention are not limited to those line-type entries 1010, 1020, 1030, and 1040 described herein. Further, the number of and information within the entries of the table 1000 may vary from those shown in FIG. 10. For instance, in the embodiment where just those nodes that are assigned an IPv4 address that matches the resolved IPv4 address are configured to provide a response to the request message 925, a column that includes "IP addresses" may be removed from the host table 1000 for being redundant.

Further, in typical embodiments, the column that includes a "Name" of the nodes represented in the host table 1000 would not be present. Accordingly, the "Name" column is shown in FIG. 10 for the purpose of explaining aspects of the present invention and for general demonstration reasons only. But, in some instances, where the host table 1000 is configured as an ARP table accessible by or residing on a DHCP server, the "Name" column might be present and populated with identifiers of various nodes in a local network.

Further, the host table 1000 my be stored in any location that is operably coupled to the originating host device A 920, thereby allowing access thereto. In one embodiment, a DHCP server may temporarily store at an address resolution protocol (ARP) table the assigned socket IP addresses in conjunction with MAC addresses, similar to the configuration shown in the host table 1000. In another embodiment, a router may store in a routing table the socket IP addresses in conjunction with MAC addresses, similar to the configuration shown in the host table 1000. In operation, the router 950 may employ the routing table to direct data packets that are transmitted outside the local network 905. These embodiments are more fully discussed below.

Referring back to FIG. 9, in one embodiment, when the originating host device A 920 constructs data packet(s) to transmit to the destination host device, which was determined to be the host device B 930 in this embodiment, the originating host device A 920 may read the host table 1000 of FIG. 10 to determine the MAC address of the destination host device B 930. Upon determining the MAC address of the destination host device B 930, the originating host device A 920 typically incorporates the MAC address into a pre-designated portion of the header of the data packet(s). Consequently, the destination host device B 930 may properly receive the data packet (s) upon transmission from the originating host device A 920.

Figure 11:
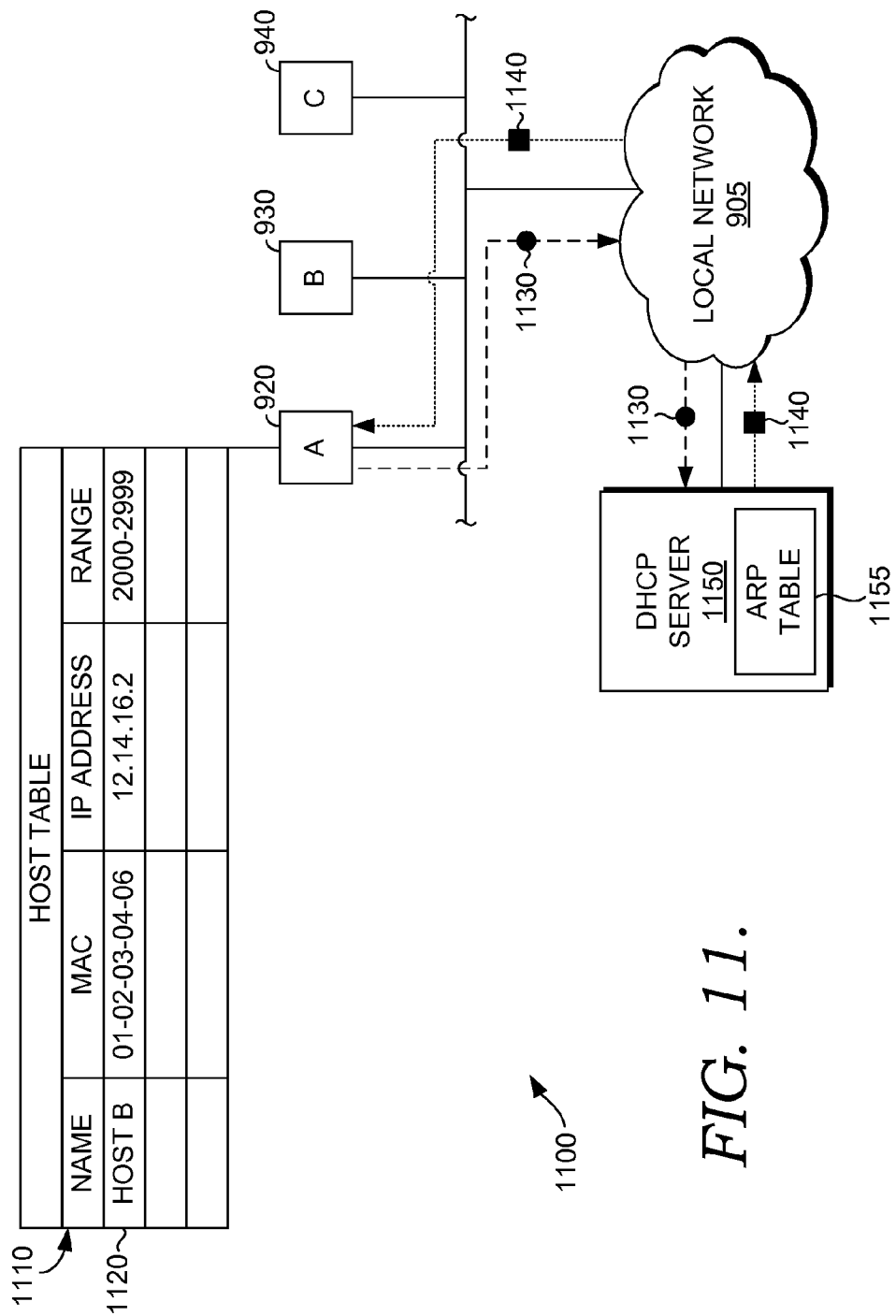
FIGS. 11 and 12 are block diagrams illustrating exemplary system architectures for routing data packets using a data-link layer address, according to embodiments of the present invention.

Referring now to FIG. 11 a block diagram illustrating an exemplary system architecture 1100 for routing data packets using a data-link layer address is shown, according to embodiments of the present invention. Initially, FIG. 11 includes a DHCP server 1150 that has stored thereon an ARP table 1155. In this embodiment, the DHCP server 1150 is generally employed to determine a MAC address of an appropriate destination host device upon being solicited by the originating host device A 920. This embodiment essentially eliminates the process of sending request messages 1130 to a multitude of host devices interconnected within the local network 905.

In embodiments, the DHCP server 1150 is generally configured to receive the request message 1130 from an originating host device, such as the host device A 920, and return a reply 1140 with a data-link layer (layer 2) address, or MAC address. In an exemplary embodiment, the DHCP server 1150 is further configured to allocate a first socket IP address (including an IPv4 address and a first range of ports), to allocate a second socket IP address (including the IPv4 address and a second range of ports), to allocate a third socket IP address (including the IPv4 address and a third range of ports), and to assign the first, second, and third socket IP addresses to the host devices 920, 930, and 940, respectively—similar to the functionality of DHCP server 650 of FIG. 6.

Typically, the DHCP server 1150 is operably coupled to the ARP table 1155 (e.g., ARP table 645 of FIG. 6) that stores, at least temporarily, the assigned socket IP addresses in association with the respective host devices 920, 930, and 940, as well as their MAC address. For instance, with regard to the originating host device A 920, the ARP table 1155 may maintain the assigned IPv4 address 12.14.16.2 (shown at reference numeral 922 of FIG. 9) and the assigned port range (shown at reference numeral 921 of FIG. 9) in association with an indicia of the host device A 920, and its MAC address 01-02-03-04-05 (see reference numeral 923 of FIG. 9).

The DHCP server 1150, in embodiments, may take the form of various types of computing devices, such as, for example, a personal computer, desktop computer, laptop computer, wireless device, consumer electronic device, handheld device (e.g., personal digital assistant), various servers, processing units distributed within a computing cloud, and the like. It should be noted, however, that the invention is not limited to implementation on such computing devices, but may be implemented on any of a variety of different types of computing devices within the scope of embodiments of the present invention. Further, the DHCP server 1150, in embodiments, may include memory that is linked to some form of a computing unit (e.g., central processing unit, microprocessor, etc.) to support operations running thereon. In another instance, the computing unit may encompass a processor (not shown) coupled to computer-readable media that stores, at least temporarily, a information formatted as the ARP table 1155, that is executable by the processor.

As discussed above, in an embodiment of operation, the DHCP server 1150 is configured to receive the request message 1130 from the originating host device A 920. The request message 1130 may take the form of an address resolution protocol (ARP) request. As used herein, the phrase "ARP request" generally refers to a computer networking protocol for determining a host device's data-link layer (layer 2) address when just the IP (layer 3) address is known. Further, this protocol may be employed in local area networking as well as for routing inter-networking traffic across gateways or routers based on IP addresses. In operation, ARP allows nodes on the same broadcast domain, or local network 905, to intercommunicate with each other. However, although the ARP request is described as an exemplary embodiment, the request message 1130 may be implemented utilizing various other communications technologies or protocols.

Typically, the request message 1130 includes an IPv4 address and a port number that were ascertained during the resolution operation discussed above. Upon identifying the resolved IPv4 address and the port number carried in the request message 1130, the DHCP server 1150 accesses the ARP table 1155 that is populated with a plurality of entries. These entries may be created upon assigning the socket IP addresses to the host devices 920, 930, and 940 when they become active within the local network 905. Also, these entries in the ARP table 1155 may include MAC addresses mapped to both IPv4 addresses and groups of ports.

Next, in embodiments, the DHCP server 1150 may compare the resolved IPv4 address received in the request message 1130 against the IPv4 addresses in the ARP table 1155 to determine a match, and may further compare the port number received in the request message 1130 against the groups of ports associated with the IPv4 address that matches the received IPv4 address. When a group of ports associated with the matching IPv4 address is ascertained to include the resolved port number, the DHCP server 1150 selects the MAC address mapped to the ascertained group of ports and sends the response 1140 that includes the selected MAC address to the originating host device A 920.

As discussed above, upon receiving the response 1140 from the DHCP server 1150, the originating host device A 920 may store the MAC address of the destination host device. In an exemplary embodiment, the originating host device A 920 may store the MAC address, IPv4 address, port numbers or range that comprise a portion of the socket IP address, and other indicia (e.g., name) of the destination host device as an entry 1120 in a host table 1110. Because just one destination host device, which is host device B 930 in this example, is referenced in the response 1140, the host table 1110 will typically include less entries than the host table 1000 of FIG. 10.

Figure 12:
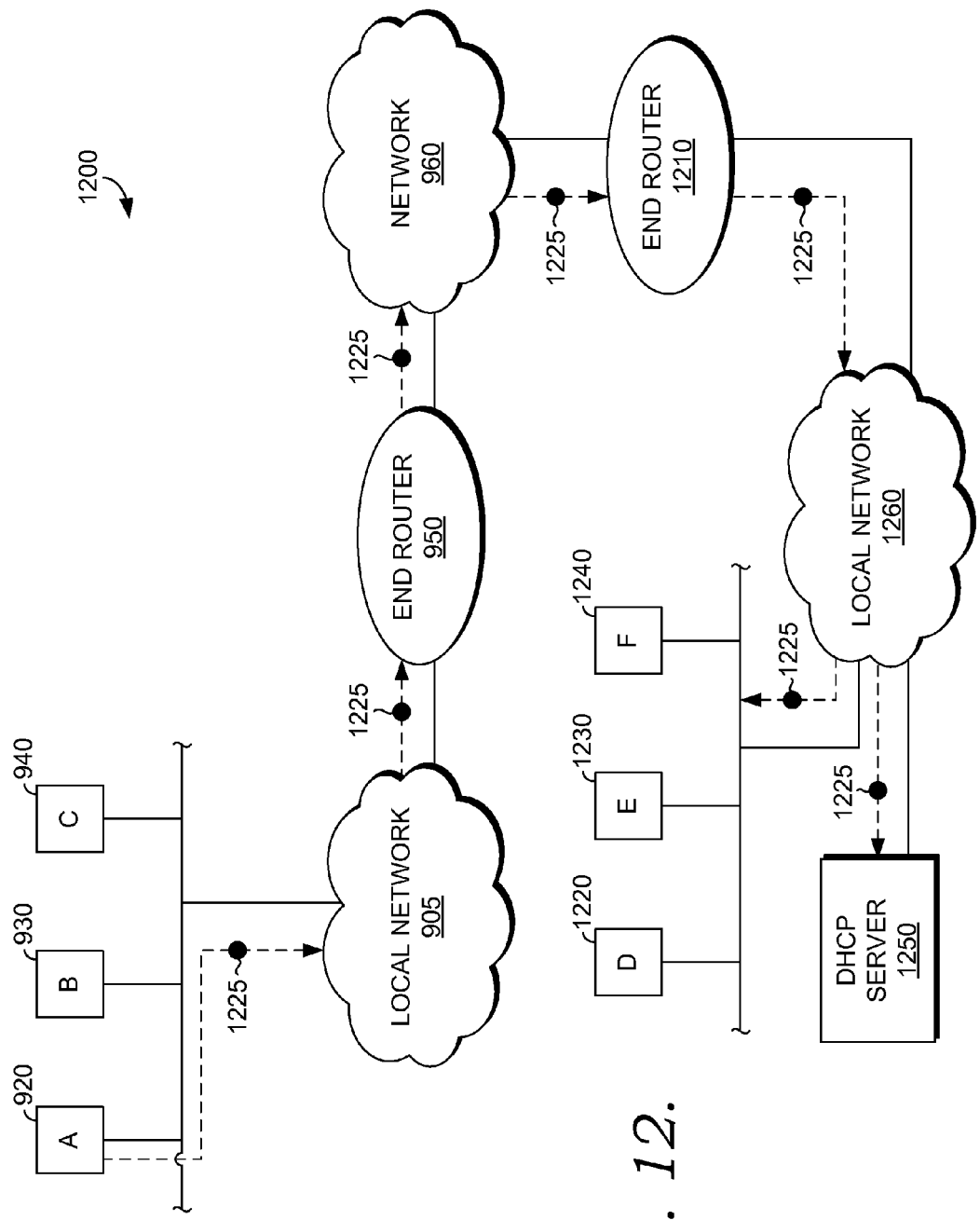

Referring now to FIG. 12, a block diagram illustrating an exemplary system architecture 1200 for routing data packets using a MAC address is shown, according to embodiments of the present invention. Initially, the originating host device A 920 sends out a request message 1225 within the local network 905. This request message 1225 may be intercepted by an end router 950 if the resolved IPv4 address included within a payload of the request message 1225 indicates a host device or a node outside the local network 905. When the resolved IPv4 address in the request message is associated with a host device or a node outside the local network 905, the end router 950 may direct the request message 1225 over network 960 (e.g., WAN) to an end router 1210 that serves as a gateway to a local network 1260. The end router 1210 is selected because an assigned IPv4 address of a node (e.g., host device D 1220, host device E 1230, or host device F 1240) interconnected within the local network 1260 corresponds with the resolved IPv4 address included within the request message 1225.

In one instance, a routing table accessible by the end router 1210 may indicate that one or more of the nodes in the local network 1260 are assigned the same IPv4 address as the resolved IPv4 address carried in the request message 1225. In this instance, the end router 1210 can access and read the routing table upon receiving the request message 1225, compare the resolved socket IP address within the request message 1225 against entries within the routing table, and direct transmission of the request message 1225 within the local network 1260. As discussed above, directing transmission of the request message 1225 may involve routing the request message 1225 to a plurality of nodes (e.g., host device D 1220, host device E 1230, or host device F 1240) within the local network 1260 in order to solicit a response thereto. Or, in another embodiment, the end router 1210 may direct transmission of the request message 1225 by routing the request message to the DHCP server 1250 connected in the local network 1260.

Turning now to FIG. 13, a flow chart is illustrated that shows an exemplary method 1300 for determining a MAC address upon being solicited by an originating host device, according to an embodiment of the present invention. Initially, an ARP request is received from the originating host device, as depicted at block 1302. Typically, the ARP request includes an IPv4 address and at least one port number ascertained in a resolution operation. As depicted at block 1304, an ARP table that is populated with a plurality of entries is accessed. In an exemplary embodiment, one or more of the plurality of entries include MAC addresses mapped to IPv4 addresses and associated groups of ports, where an IPv4 address that is associated with a particular group of ports forms a specific socket IP address.

At some time after accessing the ARP table, the IPv4 address received in the ARP request is compared against the IPv4 addresses in the ARP table to determine a match, as depicted at block 1306. In addition, the port number received in the ARP request may be compared against the groups of ports associated with the IPv4 address(es) that match the received IPv4 address, as depicted at block 1308. As depicted at block 1310, when a group of ports associated with the matching IPv4 addresses is ascertained to include the port number, the MAC address mapped to the ascertained group of ports is selected. Once the appropriate MAC address is selected, a response to the ARP request is sent to a device that originated the ARP request, as depicted at block 1312. Typically, the response includes the selected MAC address and other pertinent information.

With reference to FIG. 14, a flow chart is illustrated that shows an exemplary method 1400 for routing one or more data packets within a local network using a MAC address, according to an embodiment of the present invention. Initially, as depicted at block 1402, an ARP request is broadcast to one or more nodes connected via a local network. In an exemplary embodiment, the nodes include at least a DHCP server, an originating host device that is instructed to initiate a communication, and a destination host device that is targeted as the recipient of the communication. As more fully described above, the ARP request includes an IPv4 address and at least one port number determined during the resolution operation. As depicted at block 1404, the method 1400 further includes the step of receiving from the DHCP server or the destination host device a response to the ARP request. Typically, the response includes the MAC address that identifies the destination host device within the local network and a socket IP address assigned to the destination host device by the DHCP server. The socket IP address generally comprises the IPv4 address and a group of ports that includes the port number.

As depicted at block 1406, an entry is written into a host table upon receiving the response. Typically, the entry includes the MAC address mapped to the socket IP address and an identifier of the destination host device. When constructing the data packets for transmission, the originating host device is configured to incorporate the MAC address into a header of one or more data packets, as depicted at block 1408. Upon construction of the header and payload, the data packets are transmitted to the destination host device, as depicted at block 1410.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A computer system for determining data-link layer addresses of client devices in a local network, the system comprising:
   a destination host device that is active on the local network;
   an originating host device that broadcasts a request message to a plurality of nodes connected via the local network, wherein the request message includes an IPv4 address; and
   a dynamic host configuration protocol (DHCP) server that assigns a first socket IP address to the destination host device and a second socket IP address to the originating host device, wherein the first socket IP address includes the IPv4 address and a first group of ports, wherein the second socket IP address includes the IPv4 address and a second group of ports, and wherein the second group of ports that does not overlap the first group of ports, and wherein the DHCP server temporarily stores at an address resolution protocol (ARP) table the first socket IP address in association with the destination host device and the second socket IP address in association with the originating host device;
   wherein the originating host device writes an entry into a host table utilizing a response from the destination host device or the DHCP server to the request message, the entry including a data-link layer address mapped to the IPv4 address and the first group of ports assigned to the destination host device,
   wherein the originating host device incorporates the data-link layer address into a header of one or more data packets,
   wherein the destination host device receives the one or more data packets upon transmission from the originating host device, and
   wherein the first socket IP address uniquely identifies the destination host device from other host devices that are associated with the IPv4 address within the plurality of nodes connected via the local network.

2. The computer system of claim 1, wherein the originating host device receives an input that identifies a target of the one or more packets to be transmitted from the originating host device.

3. The computer system of claim 2, wherein the originating host device resolves the identified target into the IPv4 address and at least one port number.

4. The computer system of claim 3, wherein the originating host device utilizes a domain name system (DNS) lookup to perform the resolution of the identified target.

5. The computer system of claim 4, wherein the originating host device compares the at least one port number against one or more groups of ports written within entries of the host table, wherein the one or more groups of ports include the first group of ports assigned to the destination host device.

6. The computer system of claim 5, wherein the originating host device selects the destination host device upon ascertaining that the at least one port number matches a port number included within the first group of ports.

7. The computer system of claim 6, wherein the originating host device identifies a MAC address of the destination host device by inspecting the data-link layer address mapped to the first group of ports within the host table.

8. The computer system of claim 1, further comprising a router that stores in a routing table the first socket IP address in association with the destination host device and the second socket IP address in association with the originating host device. table to direct data packets that are transmitted outside the local network.

9. The computer system of claim 8, wherein the router employs the routing table to direct data packets that are transmitted outside the local network.

10. The computer system of claim 1, wherein the data-link layer address includes a media access control (MAC) address that identifies the destination host device as a node within the plurality of nodes to which the one or more packets are routed.

11. The computer system of claim 1, wherein, incident to sending the response to the request message, the destination host device accesses the IPv4 address carried in the request message, compares the accessed IPv4 address against the first socket IP address assigned to the destination host device, and ascertains that the accessed IPv4 address and the IPv4 address included in the first socket IP address correspond.

12. The computer system of claim 1, wherein the request message is formatted as an address resolution protocol (ARP) request.

13. A computerized method, employed by a dynamic host configuration protocol (DHCP) server, for determining a media access control (MAC) address upon being solicited by an originating host device, the method comprising:
   receiving an address resolution protocol (ARP) request from the originating host device, wherein the ARP request includes an IPv4 address and a port number, wherein the originating host device is assigned a first socket IP address that includes the IPv4 address and a first group of ports;
   accessing an ARP table that is populated with a plurality of entries, wherein one or more of the plurality of entries include MAC addresses mapped to IPv4 addresses and associated groups of ports;
   comparing at a destination host device the IPv4 address received in the ARP request against the IPv4 addresses in the ARP table to determine a match, wherein the destination host device is assigned a second socket IP address that includes the IPv4 address and a second group of ports, and wherein the second group of ports that does not overlap the first group of ports;
   comparing the port number received in the ARP request against the groups of ports associated with the IPv4 addresses that match the received IPv4 address;
   when a group of ports associated with the matching IPv4 addresses is ascertained to include the port number, selecting the MAC address mapped to the ascertained group of ports, wherein the second socket IP address includes an IPv4 address that matches the received IPv4 address and the second group of ports that includes the received port number; and
   sending a response to the ARP request, where in the response includes the selected MAC address.

14. The computerized method of claim 13, wherein the originating host device incorporates the selected MAC address within a header of one or more data packets when communicating to a destination host device, wherein the selected MAC address uniquely identifies the destination host address within a local network.

15. The computerized method of claim 14, further comprising assigning the first second socket IP address to the destination host device and the first socket IP address to the originating host device upon detecting that the destination host device and the originating host device are active in the local network.

16. One or more non-transitory computer-readable media having computer-executable instructions embodied thereon that, when executed, perform a method for routing one or more data packets within a local network using a media access control (MAC) address, the method comprising:
   broadcasting an address resolution protocol (ARP) request to one or more nodes connected via the local network, wherein the nodes include a dynamic host configuration protocol (DHCP) server, the originating host device, and a destination host device, wherein the ARP request includes an IPv4 address and a port number, wherein the originating host device is assigned a first socket IP address that includes an IPv4 address and a first group of ports, wherein the destination host device is assigned a second socket IP address that includes the IPv4 address and a second group of ports, and wherein the second group of ports that does not overlap the first group of ports;
   receiving from the DHCP server or the destination host device a response to the ARP request, wherein the response includes the MAC address that identifies the destination host device within the local network and the second socket IP address assigned to the destination host device by the DHCP server, and wherein the second group of ports of the second socket IP address includes the port number, and wherein the second socket IP address uniquely identifies the destination host device from other host devices that are associated with the IPv4 address within the nodes connected via the local network;
   at least temporarily writing an entry into a host table upon receiving the response, wherein the entry includes the MAC address mapped to the second socket IP address and an identifier of the destination host device; and
   incorporating the MAC address into a header of one or more data packets; and
   transmitting the one or more data packets to the destination host device.

* * * * *